US007177116B2

(12) United States Patent
Alonso et al.

(10) Patent No.: US 7,177,116 B2
(45) Date of Patent: Feb. 13, 2007

(54) SYSTEM, METHOD, AND APPARATUS FOR APPLYING BOUNDARY LAYER MANIPULATION TECHNIQUES TO THE AIR FLOW INSIDE ROTARY DISK STORAGE DEVICES

(75) Inventors: Juan Jose Alonso, Stanford, CA (US); Andre Sirilutporn Chan, Milpitas, CA (US); Ferdinand Hendriks, Morgan Hill, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 350 days.

(21) Appl. No.: 10/792,567

(22) Filed: Mar. 3, 2004

(65) Prior Publication Data

US 2005/0195522 A1    Sep. 8, 2005

(51) Int. Cl.
*G11B 33/14* (2006.01)
(52) U.S. Cl. ............... 360/97.02; 360/97.01; 360/97.03; 360/97.04; 720/648; 720/651
(58) Field of Classification Search ........... 360/97.02, 360/97.03, 97.04
See application file for complete search history.

(56) References Cited

U.S. PATENT DOCUMENTS

| | | | | |
|---|---|---|---|---|
| 4,809,102 A | * | 2/1989 | Hatchett et al. | ......... 360/97.03 |
| 5,034,835 A | | 7/1991 | Yokoyama et al. | |
| 5,140,578 A | | 8/1992 | Tohkairin | |
| 6,091,570 A | * | 7/2000 | Hendriks | ................. 360/97.03 |
| 6,097,568 A | * | 8/2000 | Ekhoff | .................... 360/97.02 |
| 6,099,609 A | * | 8/2000 | Lira et al. | .................... 55/400 |
| 6,395,073 B1 | * | 5/2002 | Dauber | ....................... 96/134 |
| 6,493,180 B1 | * | 12/2002 | Kang et al. | .............. 360/97.02 |
| 6,560,065 B1 | * | 5/2003 | Yang et al. | .............. 360/97.02 |
| 6,826,009 B1 | * | 11/2004 | Scura et al. | ............. 360/97.03 |
| 6,987,640 B2 | * | 1/2006 | Tsang et al. | ............ 360/97.02 |
| 6,989,959 B2 | * | 1/2006 | Chang et al. | ............ 360/97.02 |
| 7,023,655 B2 | * | 4/2006 | Smith | ...................... 360/97.02 |
| 7,057,851 B2 | * | 6/2006 | Sun et al. | ................ 360/97.02 |
| 2002/0075591 A1 | | 6/2002 | Chang et al. | |
| 2002/0149876 A1 | | 10/2002 | Sakata et al. | |
| 2003/0210492 A1 | * | 11/2003 | Adams et al. | ........... 360/97.02 |
| 2004/0040695 A1 | * | 3/2004 | Chesser et al. | ........ 165/104.21 |

FOREIGN PATENT DOCUMENTS

| | | | |
|---|---|---|---|
| DE | 3150724 A1 | * | 7/1983 |
| JP | 61198485 | | 9/1986 |
| JP | 11201503 A | * | 7/1999 |
| JP | 2002109858 A | * | 4/2002 |
| JP | 2004337684 A | * | 12/2004 |
| WO | WO 2077989 A2 | * | 10/2002 |

* cited by examiner

*Primary Examiner*—Andrea Wellington
*Assistant Examiner*—Matthew G. Kayrish
(74) *Attorney, Agent, or Firm*—Bracewell & Giuliani LLP

(57) ABSTRACT

A system, method, and apparatus for solving flow-induced track misregistration (TMR) problems in hard disk drives (HDD). Boundary layer manipulation techniques are applied to the airflow in the HDD, such as boundary layer suction with slots or holes, and wall damping techniques, such as an open honeycomb seal and Helmholtz resonators. These flow-conditioning solutions reduce the turbulence intensity throughout the HDD to reduce TMR. These solutions achieve these goals while minimizing increases in the running torque needed to overcome their inherent rotational drag.

17 Claims, 7 Drawing Sheets

SYSTEM, METHOD, AND APPARATUS FOR APPLYING BOUNDARY LAYER MANIPULATION TECHNIQUES TO THE AIR FLOW INSIDE ROTARY DISK STORAGE DEVICES

BACKGROUND OF THE INVENTION

1. Technical Field

The present invention relates in general to an improved architecture for conditioning flow inside data storage devices and, in particular, to an improved system, method, and apparatus for applying boundary layer manipulation techniques to the air flow inside rotary disk storage devices.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and micro drive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

One of the major hurdles in hard disk drive (HDD) development is track misregistration (TMR). TMR is the term used for measuring data errors while a HDD writes data to and reads data from the disks. One of the major contributors to TMR is flow-induced vibration. Flow-induced vibration is caused by turbulent flow within the HDD. The nature of the flow inside a HDD is characterized by the Reynolds number, which is defined as the product of a characteristic speed in the drive (such as the speed at the outer diameter of the disk), and a characteristic dimension (such as the disk diameter or, for some purposes, disk spacing). In general, the higher the Reynolds number, the greater the propensity of the flow to be turbulent.

Due to the high rotational speed of the disks and the complex geometries of the HDD components, the flow pattern inside a HDD is inherently unstable and non-uniform in space and time. The combination of flow fluctuations and component vibrations are commonly referred to as "flutter" in the HDD literature. The more precise terms "disk flutter" and "arm flutter" refer to buffeting of the disk and arm, respectively, by the air flow. Unlike true flutter, the effect of the vibrations in HDDs on the flow field is usually negligible. Even small arm and disk vibrations (at sufficiently large frequencies, e.g., 10 kHz and higher), challenge the ability of the HDD servo system to precisely follow a track on the disk.

Since the forcing function of vibrations is directly related to flow fluctuations, it is highly desirable to reduce any fluctuating variation in the flow structures of air between both co-rotating disks and single rotating disks. Thus, a system, method, and apparatus for improving the architecture for conditioning air flow inside data storage devices is needed.

SUMMARY OF THE INVENTION

One embodiment of a system, method, and apparatus of the present invention attempts to apply several techniques to solve track misregistration (TMR) problems in hard disk drives (HDD). Boundary layer manipulation techniques are applied to the airflow in the HDD, such as boundary layer suction with slots or holes, and wall damping techniques, such as an open honeycomb seal and Helmholtz resonators.

The flow-conditioning solutions presented in the present application reduce the turbulence intensity throughout the HDD to reduce TMR. These solutions achieve these goals while minimizing increases in the running torque needed to overcome their inherent rotational drag. One solution affects the stability of the HDD flow and enables the flow to follow complex geometries and regions with adverse pressure gradients (i.e., increasing pressure in the direction of flow) without flow separation. Separated regions are a major source of flow fluctuations when the Reynolds number is sufficiently large. The latter is true for typical prior art HDD configurations. Suction inhibits turbulent mixing between the Ekman layers spun off the disk and their return flow. Reduced mixing leads to a reduction in the aerodynamic torque needed to spin the disk pack.

For example, the head disk assembly (HDA) wall may be fitted with arrays of suction holes or slots or a combination of the two. Air from the wall boundary layer is sucked through the holes and slots into a suction plenum. The suction air is reintroduced into the file at a suitable location such as at the hub perforations. Hub ventilation reduces flow-induced TMR, even without wall suction. The suction air also may be passed through an HDA air filter before being reintroduced into the disk pack.

Yet another solution damps turbulent fluctuations via the dissipation generated inside special linings, such as a multitude of micro cavities. For example, a damped wall can take the form of a honeycomb lining. Alternatively, the wall can form a close-packed array of Helmholtz resonators, which are essentially walled cavities with a small orifice. Because these resonators can be tuned, they are particularly effective in suppressing narrow-band fluctuations.

The application of these special linings along the interior walls of the HDD provide aerodynamic and acoustic damping. Suitable linings promote viscous dissipation of the fluctuations, and may take forms such as closed and open cell acoustic foam, and arrays of tuned cavities, as described above. In particular, the Helmholtz resonators may be tuned to act as acoustic notch filters or certain prominent frequencies in the file. For example, one such frequency is the vortex shedding frequency associated with the actuator arm.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
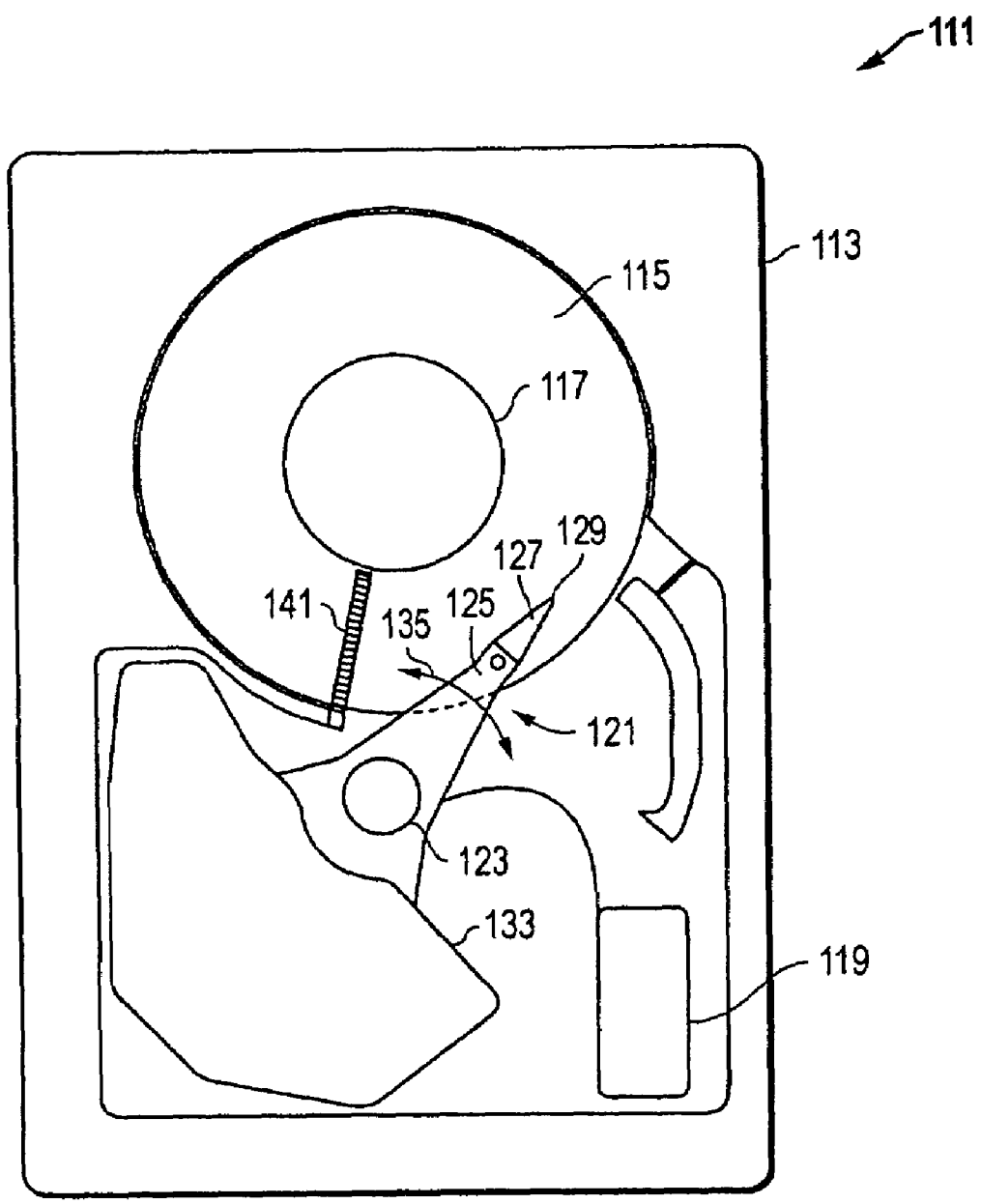
FIG. 1 is a top plan view of one embodiment of a disk drive constructed in accordance with the present invention.

Referring to FIG. 1, one embodiment of a system, method, and apparatus for reducing track misregistration in disk drives is shown. This embodiment employs an information storage system comprising a magnetic hard disk file or drive 111 for a computer system. Drive 111 has an outer housing or base 113 (e.g., an enclosure) containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
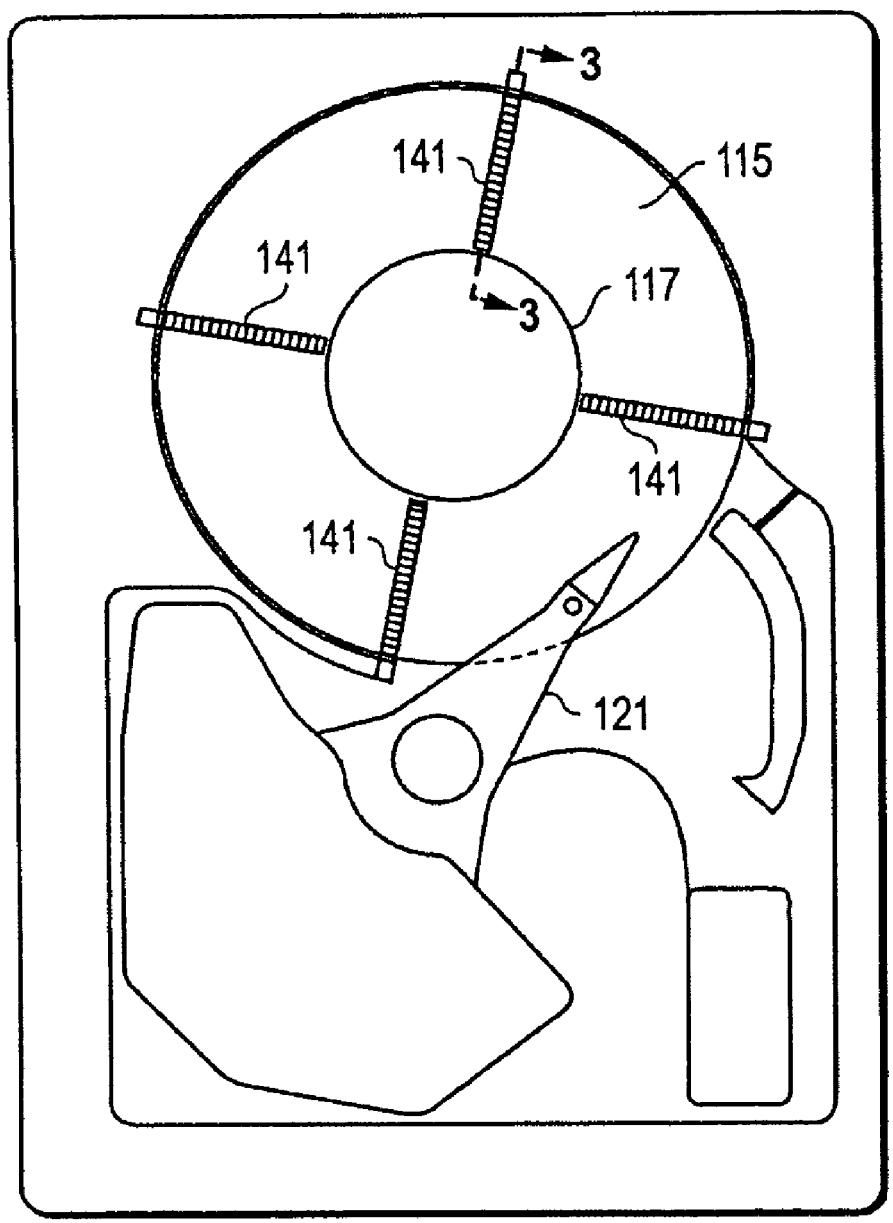
FIG. 2 is a top plan view of another embodiment of a disk drive constructed in accordance with the present invention.
Figure 3:
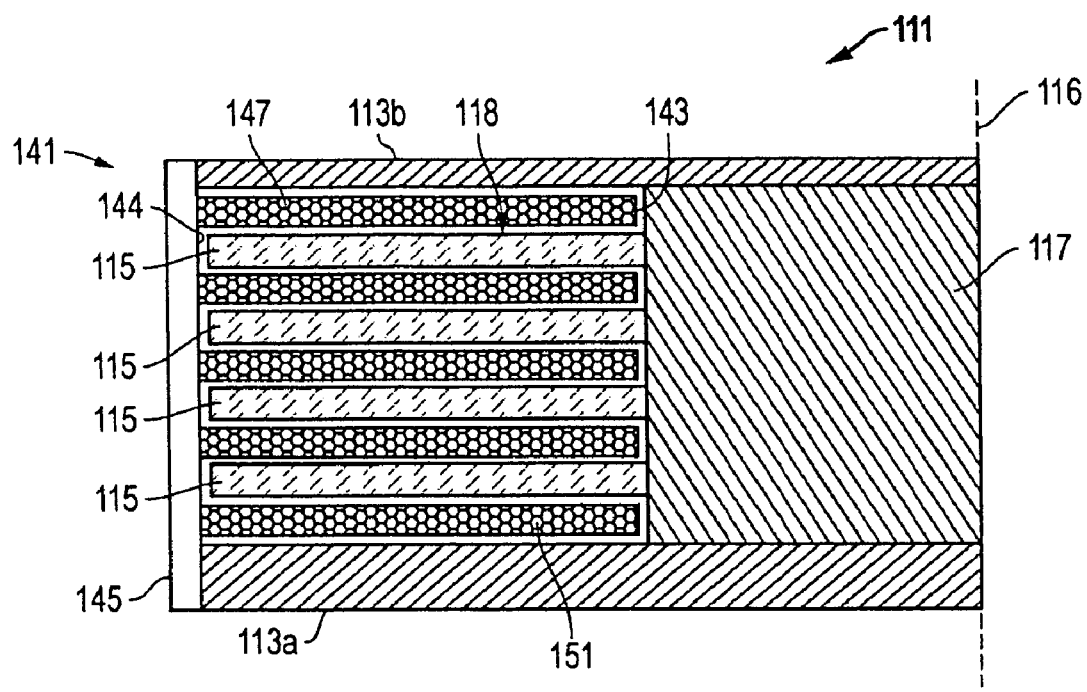
FIG. 3 is a sectional side view of one embodiment of an interleaf structure taken along the line 3—3 of FIG. 2.
Figure 4:
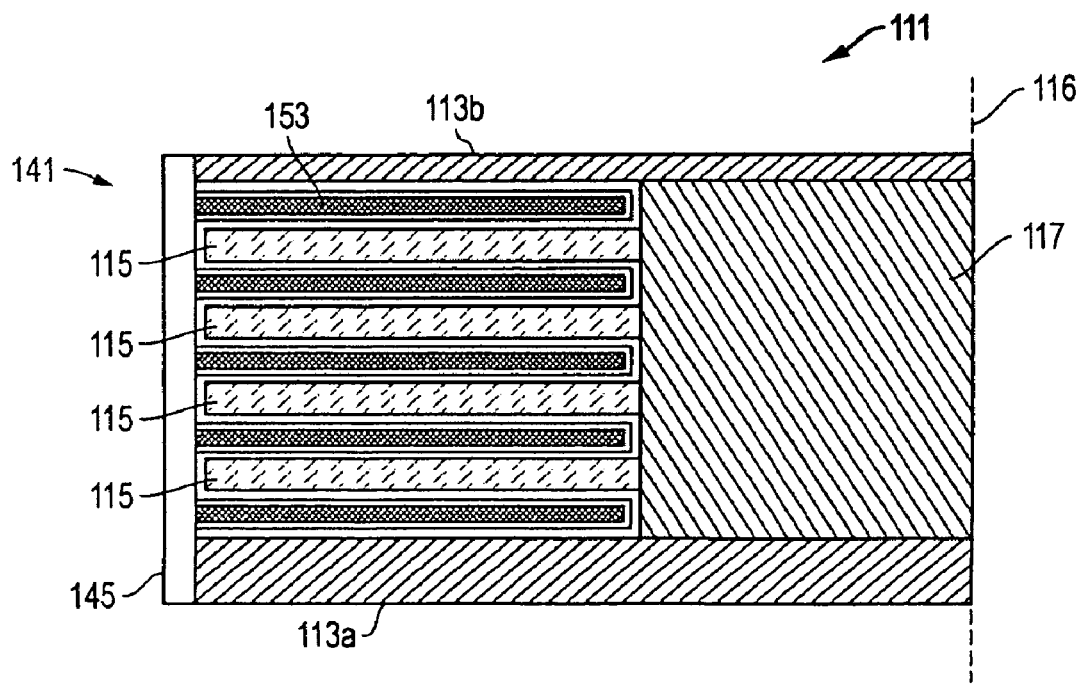
FIG. 4 is a sectional side view of an alternate embodiment of the interleaf structure of FIG. 3.

Referring now to FIGS. 1 and 2, drive 111 further comprises a flow-conditioning device 141 that is mounted to the enclosure 113 adjacent to the disk 115. The flow-conditioning device 141 comprises one or more "flow straighteners" that may be either symmetrically arrayed or asymmetrically about the disk 115, depending upon the application. FIG. 2 illustrates the symmetrical arrangement. Each flow-conditioning device 141 comprises a foundation or support post 145 that is mounted to the enclosure 113. As shown in FIG. 3, one embodiment of support post 145 is mounted to and extends between both portions of the enclosure 113: base plate 113a and top cover 113b.

The flow-conditioning device 141 includes at least one projection or finger 143 (e.g., five shown for four disks 115 in FIG. 3) having passages 147. The fingers 143 extend radially with respect to the disks 115 and their axis 116, and parallel to the surface 118 of the disks 115. When two or more fingers 143 are used, the adjacent fingers 143 define a slot 144 that closely receives the two parallel surfaces of the disk 115. The fingers 143 originate at the support post 145 and preferably extend to or near the disk hub 117. However, there is no contact between any portion of the flow-conditioning device 141 and the disks 115.

Each finger 143 comprises a small, generally rectangular frame having a plurality of the passages 147 that permit air flow to move all the way through the finger 143. The passages 147 are formed in the finger 143 in directions that are axially and radially transverse (e.g., perpendicular) with respect to the disks 115. Each of the fingers 143 has the passages 147 to reduce air flow turbulence intensity and track misregistration.

The fingers 143 are positioned in the air flow stream generated by the disks 115 so that, as the disks 115 rotate, the passages 147 are aligned with the air flow stream and reduce an air flow turbulence intensity and track misregistration between the heads on the sliders 129 and the read/write tracks on the disks 115. The turbulent energy generated by the flow-conditioning device(s) 141 is confined to a range of smaller eddies that are more easily dissipated within the disk drive 111 than prior art large eddies. Each finger 143 has an angular or arcuate width in a range of approximately 5 degrees or less. Each finger 143 also can be configured to have a constant width along the radial direction of the disk 115.

As shown in FIGS. 3–7, the passages 147 may comprise many different configurations or combinations thereof. For example, in FIG. 3, the passages 147 are configured in a honeycomb structure 151 having a tight array of one or more hexagonal feature(s) that extend across the entire face of the fingers 143. In one embodiment, the passages 147 (honeycomb cell size) are on the order of five times smaller than the axial disk spacing. In addition, the fingers 143 may have an arcuate width that is approximately equal to said axial distance minus a mechanical clearance on the order of 0.5 mm.

In another embodiment (FIG. 4), the passages are formed from wire screen walls 153, which may be woven, mounted on a framing structure. The wire screen dimensions are dictated by the size of the disk diameter and spacing. Typically, the wire screen walls 153 comprise at least two or three passages across the vertical direction. In one version, the wire screen walls 153 have a thickness on the order of 0.1 mm.

Figure 5:
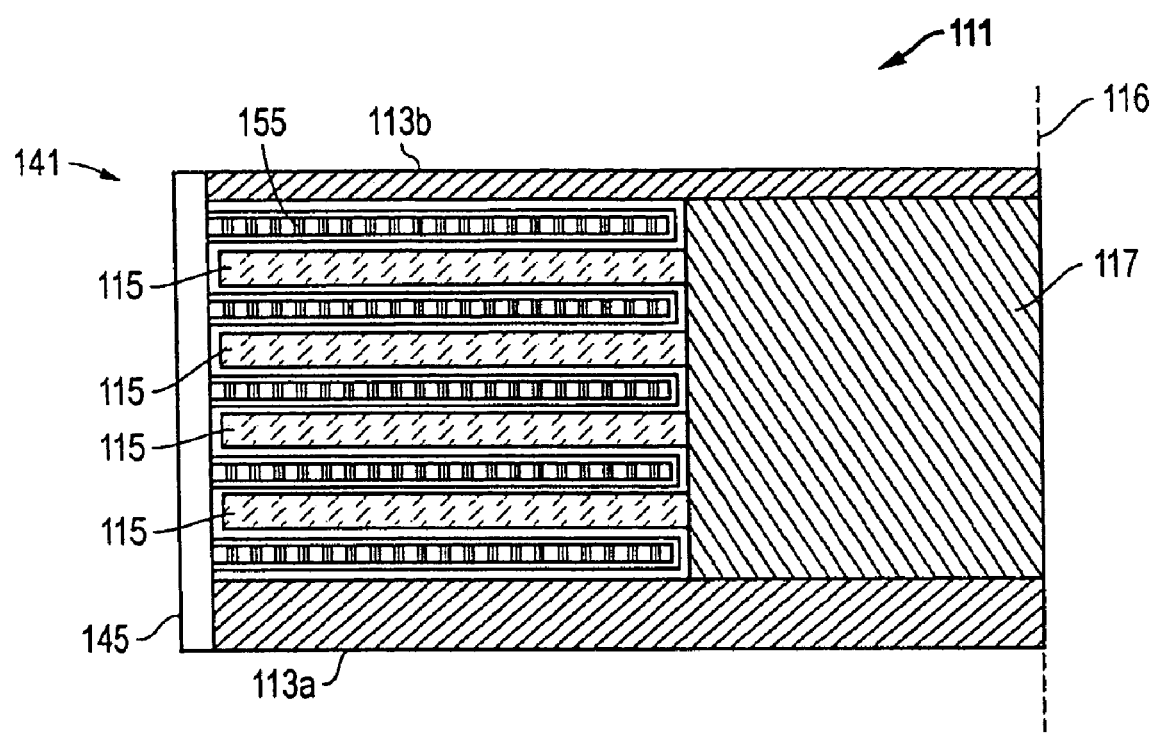
FIG. 5 is a sectional side view of another alternate embodiment of the interleaf structure of FIG. 3.

In FIG. 5, the passages comprise sets of guide vanes 155 that extend axially with respect to the disk 115. In the embodiment shown, the guide vanes 155 are grouped in small sets of three that radially offset from each other. The individual vanes in guide vanes 155 are parallel to each other. Other guide vane configurations are possible, including those of the slanted type. The guide vanes have a thickness that is sufficient to ensure mechanical stability and ruggedness, which may be on the order of 0.3 mm.

Figure 6:
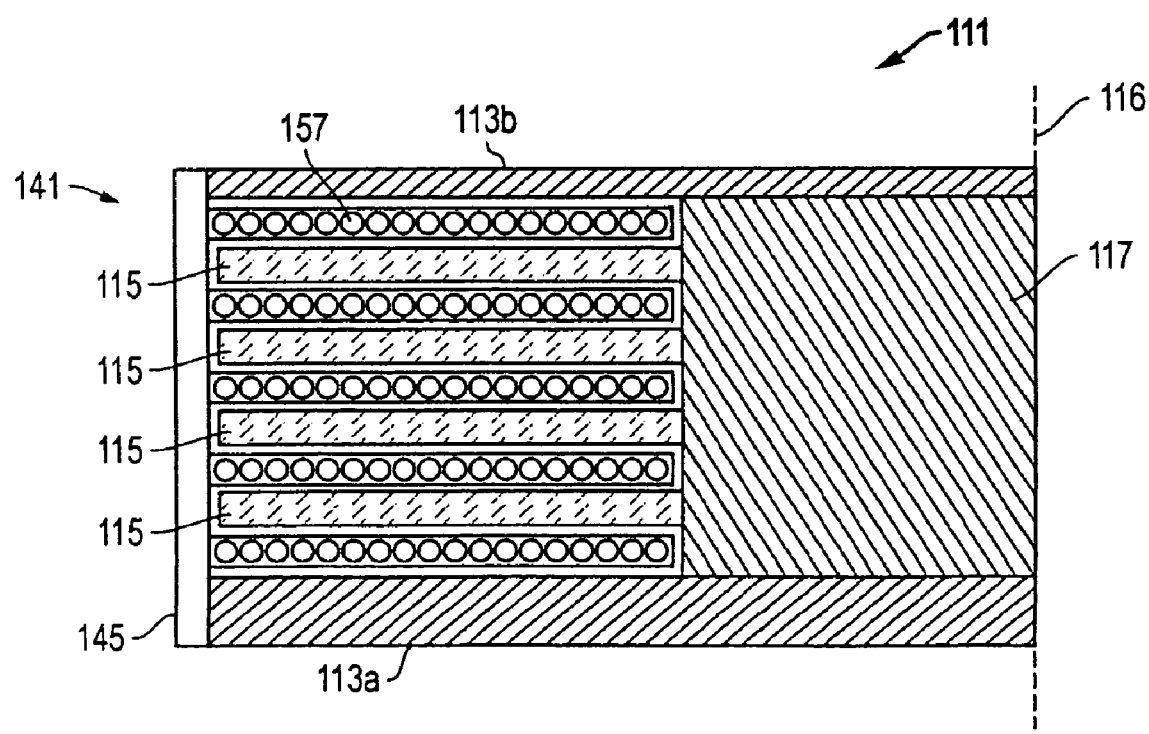
FIG. 6 is a sectional side view of yet another alternate embodiment of the interleaf structure of FIG. 3.

Alternatively, the passages may be formed by cylindrical tubes 157, as shown in FIG. 6. The cylindrical tubes 157 may comprise many different configurations, such as side-by-side in a flat array having a single row of the axially parallel cylindrical tubes 157. In another embodiment (FIG. 7), the cylindrical tubes 159 form a plurality (two shown) of parallel rows that are configured in an alternating pattern of upper and lower positions.

Figure 8:
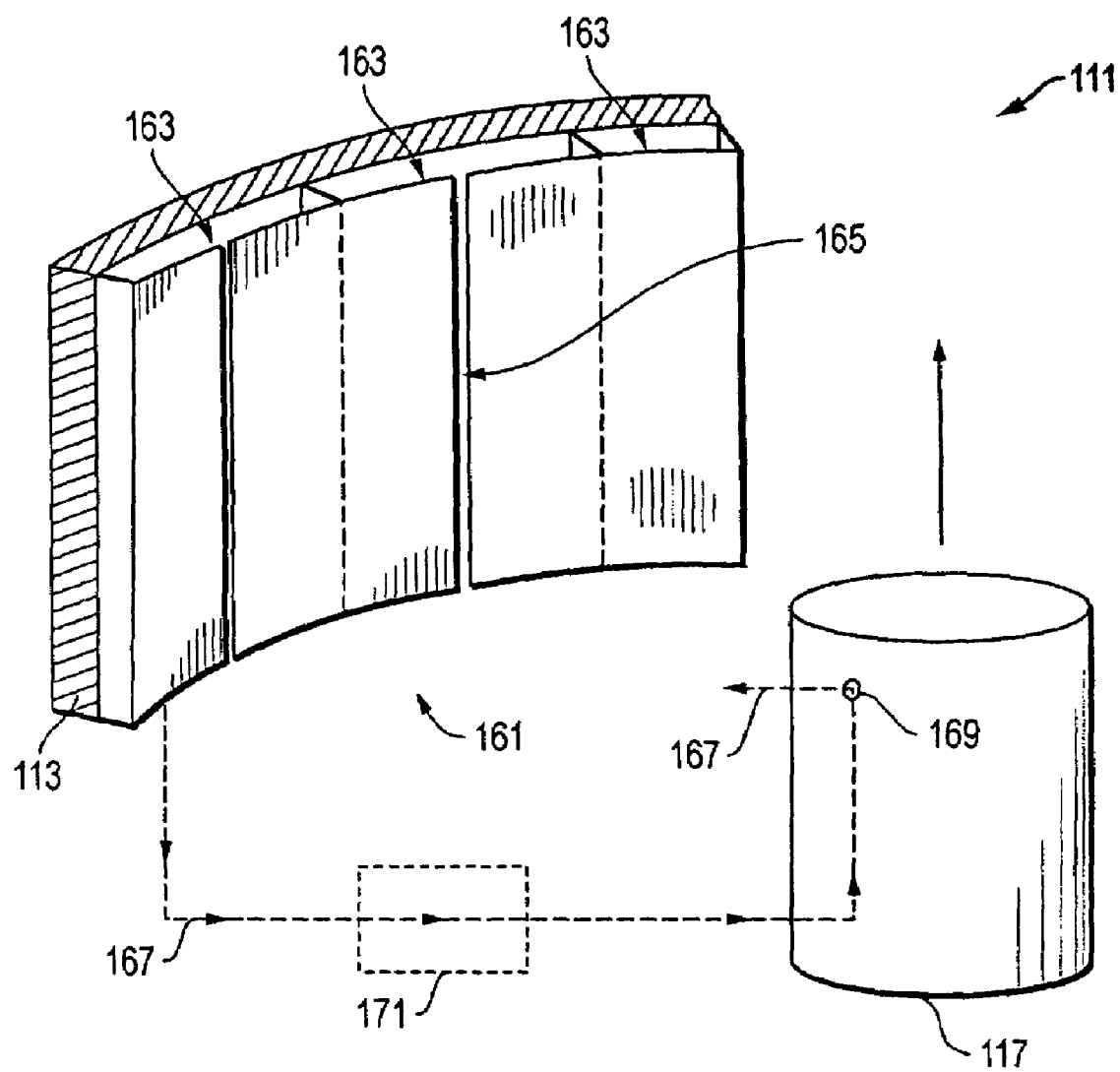
FIG. 8 is a partial isometric view of one embodiment of a boundary layer device for a disk drive enclosure.

Referring now to FIG. 8, an inner wall of the enclosure 113 may be configured with a boundary layer device 161. The boundary layer device 161 is designed to manipulate the air flow inside the disk drive 111 to provide aerodynamic and acoustic damping that promote viscous dissipation of turbulent fluctuations.

The boundary layer device may comprise many different forms. For example, in FIG. 8, a suction plenum 163 having an array of suction apertures 165 is shown. The apertures 165 may comprise slots, holes, and/or combinations thereof, and are used to evacuate air flow from the interior of the disk drive 111 into the suction plenum 163. The air flow (see arrows 167) is then reintroduced into the interior of the disk drive 111 at a suitable location, such as at perforations 169 in hub 117 (for clarity, disks 115 are not shown). Moreover, the suction air also may be passed through an air filter 171 before being reintroduced into the pack of disks 115.

Figure 9:
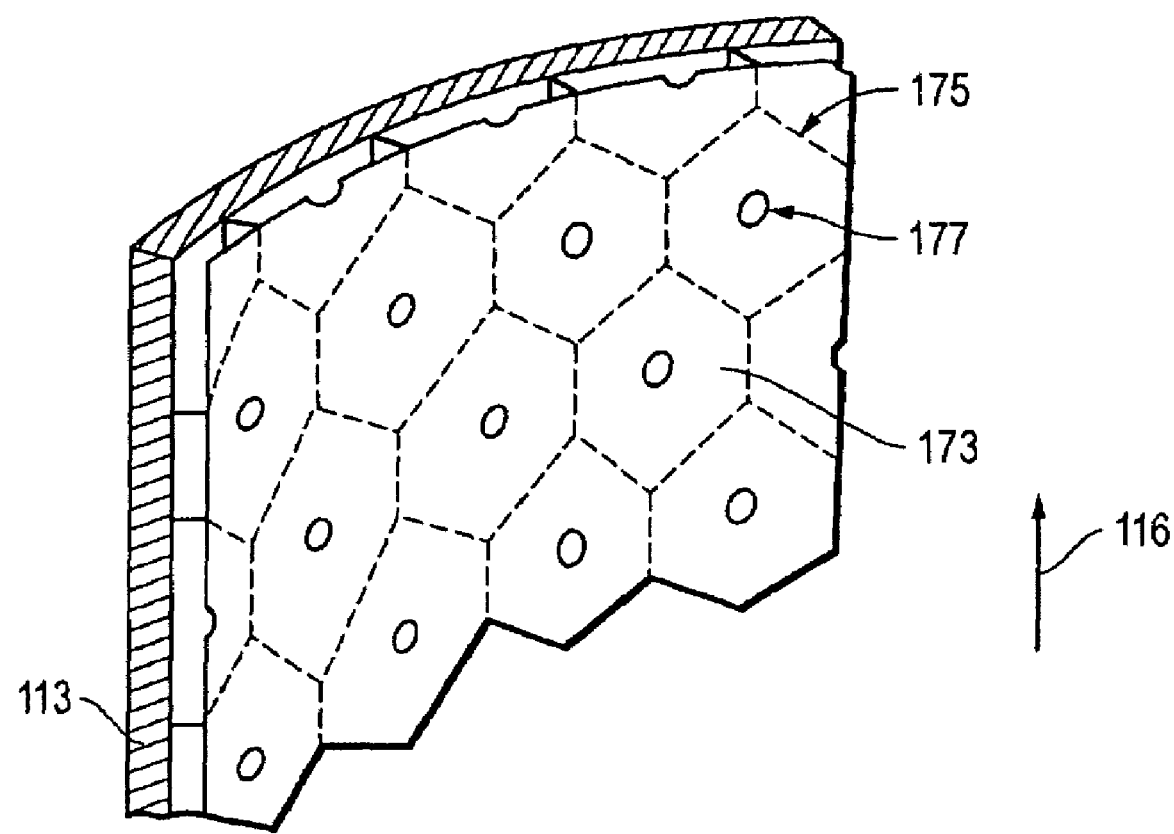
FIG. 9 is a partial isometric view of an alternate embodiment of the boundary layer device of FIG. 8.

An alternative embodiment of the boundary layer device is shown in FIG. 9 as a lining of cavities 173 on the inner wall of enclosure 113. In one version, the cavities 173 comprise a honeycomb of hexagonal walls 175, each of which is perforated by a small orifice 177. Collectively, these cavities 173 form a close-packed array of Helmholtz resonators. Because these resonators can be tuned, they are particularly effective in suppressing narrow-band turbulence fluctuations. In particular, the Helmholtz resonators may be tuned to act as acoustic notch filters or certain prominent frequencies in the file. For example, one such frequency is the vortex shedding frequency associated with the actuator arm. In addition, the cavities may comprise closed and open cell acoustic foam.

The present invention also comprises a method of reducing track misregistration in a disk drive. In one embodiment (FIG. 1), the method comprises providing a disk drive 111 having an enclosure 113, a disk 115 having a surface 118 with tracks, and an actuator 121 having a head for reading from and writing to the tracks. The method further comprises positioning a flow-conditioning device 141 (FIG. 3) adjacent to the surface 118 of the disk 115, rotating the disk 115 to generate an air flow, flowing the air flow through passages 147 in the flow-conditioning device 141, and thereby reducing air flow turbulence intensity and track misregistration between the head and the tracks on the disk 115.

Figure 7:
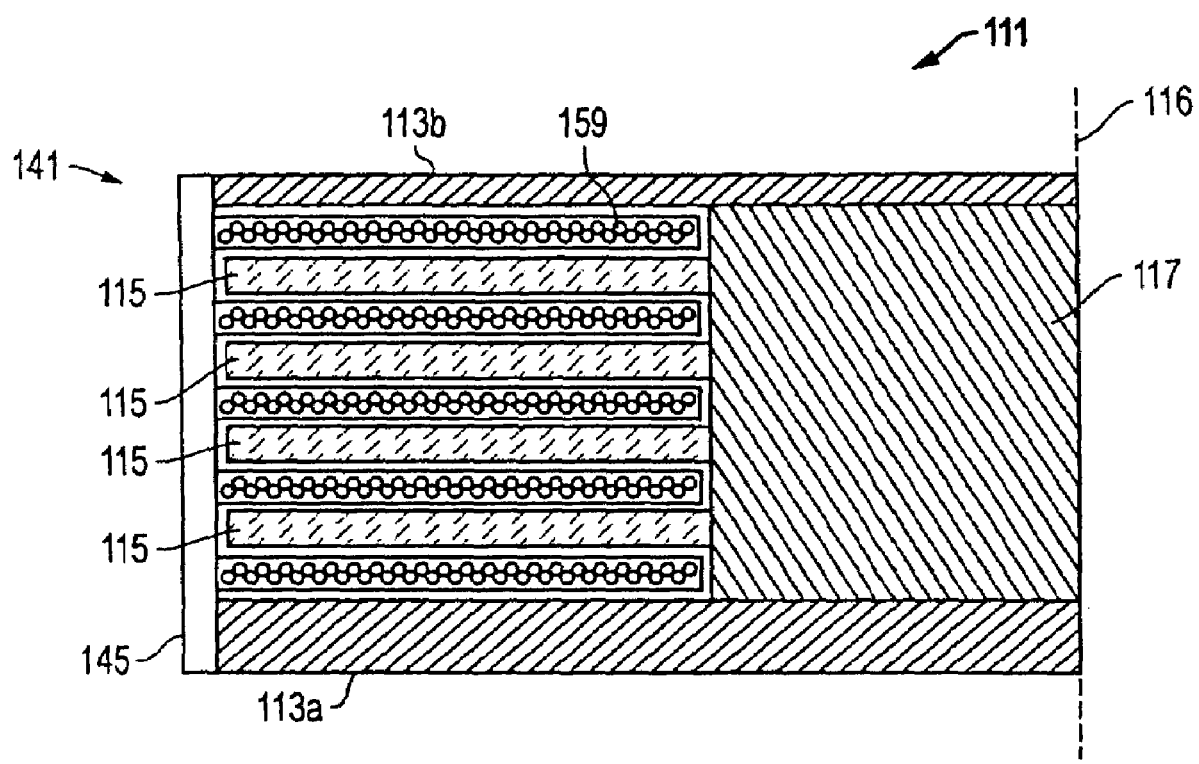
FIG. 7 is a sectional side view of still another alternate embodiment of the interleaf structure of FIG. 3.

The method also may comprise positioning the disk 115 in an elongated slot 144 in the flow-conditioning device 141. The method may further comprise orienting the passages 147 at axially and radially transverse positions with respect to the disk 115, and forming the passages in a configuration selected from the group consisting of: a honeycomb structure (FIG. 3), wire screen walls (FIG. 4), guide vanes (FIG. 5), and cylindrical tubes (FIGS. 6 and 7). In another embodiment, the method may further comprise forming a symmetrical array (FIG. 2) of the flow-conditioning devices 141 about the disk 115.

Alternatively, or in combination with any of the foregoing steps of the method, the method may further comprise forming a boundary layer device 161 (FIGS. 8 and 9) on an inner surface of the enclosure 113, and manipulating the air flow inside the disk drive 111 with the boundary layer device 161 to provide aerodynamic and acoustic damping that promote viscous dissipation of turbulent fluctuations. The method may comprise evacuating air flow from an interior of the disk drive 111 into a suction plenum 163 (FIG. 8), and reintroducing the air flow into the disk drive 111. In addition, the method may comprise configuring the boundary layer device as a lining of walled cavities 173 (FIG. 9), each having a small orifice 177 in communication with the interior of the disk drive 111.

The present invention has several advantages, including the ability to reduce TMR problems in hard disk drives HDDs. These solutions break up large-scale eddies, straighten air flows, and manipulate the boundary layers. As a result, the turbulence intensity is reduced throughout the HDD to reduce TMR while minimizing increases in the running torque needed to overcome rotational drag. The turbulent energy generated by the devices is confined to a range of smaller eddies that are more easily dissipated. The LEBU devices can be used individually or as multiple units in series.

The present invention also enables the flow to follow complex geometries without flow separation. Suction inhibits turbulent mixing between the Ekman layers spun off the disk and their return flow. Reduced mixing leads to a reduction in the aerodynamic torque needed to spin the disk pack. In addition, turbulent fluctuations are dampened via the dissipation generated by the special linings, some of which can be tuned to suppress narrow-band fluctuations. The application of these special linings along the interior walls of the HDD provide aerodynamic and acoustic damping. In particular, the Helmholtz resonators may be tuned to act as acoustic notch filters or certain prominent frequencies in the file.

While the invention has been shown or described in only some of its forms, it should be apparent to those skilled in the art that it is not so limited, but is susceptible to various changes without departing from the scope of the invention.

What is claimed is:

1. A disk drive, comprising:
    an enclosure having a base and an inner wall that defines a boundary at an inner perimeter of the enclosure;
    a disk mounted to the base of the enclosure for rotation relative thereto, the disk having a surface with tracks;

an actuator having a head and mounted to the enclosure for moving the head relative to the disk such that the head reads information from and writes information to the tracks on the disk;

the inner wall of the enclosure having a boundary layer device mounted thereto and extending therefrom to manipulate the air flow inside the disk drive to provide aerodynamic and acoustic damping that promote viscous dissipation of turbulent fluctuations to reduce an air flow turbulence intensity and track misregistration between the head and the tracks on the disk; and wherein the boundary layer device comprises acoustic foam.

2. The disk drive of claim 1, wherein the boundary layer device comprises a suction plenum formed directly on the inner wall of the enclosure and having an array of suction apertures for evacuating air flow from an interior of the disk drive into the suction plenum, and reintroducing the air flow into the disk drive.

3. The disk drive of claim 2, wherein the suction plenums comprise rectangular cavities, the suction apertures comprise slots, the evacuated air flow passes through an air filter before being reintroduced, and the evacuated air flow is reintroduced at perforations in a hub that supports the disk.

4. The disk drive of claim 1, wherein the boundary layer device comprises a lining of walled cavities formed directly on the inner wall of the enclosure, each having a small orifice in communication with the interior of the disk drive.

5. The disk drive of claim 4, wherein the each of the walled cavities comprise a honeycomb of hexagonal walls that are perforated by the small orifices.

6. The of claim 1, further comprising a flow-conditioning device for conditioning air flow about the disk, the flow-conditioning device being separate from the boundary layer device and mounted to the base of the enclosure.

7. The disk drive of claim 1, wherein the walled cavities form a close-packed array of Helmholtz resonators tuned to act as acoustic notch filters.

8. A system for reducing track misregistration in a disk drive, comprising:
an enclosure having an inner surface;
a disk mounted to the enclosure for rotation relative thereto, the disk having a surface with tracks;
an actuator having a head and mounted to the enclosure for moving the head relative to the disk such that the head reads information from and writes information to the tracks on the disk;
a flow-conditioning device mounted to the enclosure adjacent to the disk, the flow-conditioning device having a pair of fingers extending radially with respect to the disk and parallel to the surface of the disk, the pair of fingers forming an elongated slot in which the disk is located;
a plurality of passages formed in each of the fingers, the passages being open for air flow, and axially and radially transverse with respect to the disk, and the fingers being positioned in an air flow stream generated by the disk so that, as the disk rotates, the passages align with the air flow stream and allow the air flow stream to pass through the open passages to reduce an air flow turbulence intensity and track misregistration between the head and the tracks on the disk; and
a boundary layer device formed on the inner surface of the enclosure separate from the flow-conditioning device for manipulating the air flow inside the disk drive to provide aerodynamic and acoustic damping that promote viscous dissipation of turbulent fluctuations; and wherein
the boundary layer device comprises a lining of walled cavities that form a honeycomb of hexagonal walls, each having a small orifice in communication with the interior of the disk drive.

9. The system of claim 8, wherein the flow-conditioning device comprises a plurality of the flow-conditioning devices, each of which is separate from the boundary layer device, and the plurality of flow-conditioning devices are mounted to the enclosure in a symmetrical array about the disk.

10. The system of claim 8, wherein the boundary layer device comprises a suction plenum having an array of suction apertures for evacuating air flow from an interior of the disk drive into the suction plenum, and reintroducing the air flow into the disk drive at perforations in a hub that supports the disk.

11. The system of claim 10, wherein the suction plenums comprise rectangular cavities and the suction apertures comprise slots.

12. The system of claim 8, wherein the honeycomb of hexagonal walls are perforated by the small orifices.

13. A method of reducing track misregistration in a disk drive, comprising:
(a) providing a disk drive having an enclosure with a base and a side wall, a disk having a surface with tracks mounted to the base, and an actuator mounted to the base and having a head for reading from and writing to the tracks;
(b) forming a boundary layer device comprising acoustic foam directly on the side wall of the enclosure such that the boundary layer device extends from the side wall into an interior of the enclosure;
(c) rotating the disk to generate an air flow;
(d) manipulating the air flow inside the disk drive with the boundary layer device to provide aerodynamic and acoustic damping that promote viscous dissipation of turbulent fluctuations; and
(e) reducing air flow turbulence intensity and track misregistration between the head and the tracks on the disk.

14. The method of claim 13, further comprising evacuating air flow from an interior of the disk drive into a suction plenum, passing the evacuated air flow through an air filter, and reintroducing the air flow into the disk drive at perforations in a hub that supports the disk.

15. The method of claim 13, further comprising configuring the boundary layer device as a lining of walled cavities that form a honeycomb of hexagonal walls, each having a small orifice in communication with the interior of the disk drive.

16. The method of claim 13, further comprising positioning a flow-conditioning device mounted to the base of the enclosure separate from the boundary layer device and adjacent to the surface of the disk, and flowing the air flow through passages in the flow-conditioning device to reduce air flow turbulence intensity and track misregistration.

17. The method of claim 13, wherein the boundary layer device comprises a close-packed array of Helmholtz resonators tuned to act as acoustic notch filters.

* * * * *